US012781709B2

(12) United States Patent
García Ferrández

(10) Patent No.: US 12,781,709 B2
(45) Date of Patent: Nov. 3, 2026

(54) MOORING SYSTEM

(71) Applicant: GAZELLE WIND POWER LIMITED, Dublin (IE)

(72) Inventor: Antonio García Ferrández, Madrid (ES)

(73) Assignee: GAZELLE WIND POWER LIMITED, Dublin (IE)

(*) Notice: Subject to any disclaimer, the term of this patent is extended or adjusted under 35 U.S.C. 154(b) by 118 days.

(21) Appl. No.: 18/869,275

(22) PCT Filed: May 22, 2023

(86) PCT No.: PCT/IB2023/055233

§ 371 (c)(1),
(2) Date: Nov. 26, 2024

(87) PCT Pub. No.: WO2023/228042

PCT Pub. Date: Nov. 30, 2023

(65) Prior Publication Data

US 2026/0022686 A1 Jan. 22, 2026

(30) Foreign Application Priority Data

May 26, 2022 (ES) ................................ ES202230449

(51) Int. Cl.
*B63B 21/50* (2006.01)
*B63B 35/44* (2006.01)
*F03D 13/25* (2016.01)

(52) U.S. Cl.
CPC ............ *F03D 13/256* (2023.08); *B63B 21/50* (2013.01); *B63B 35/44* (2013.01); *B63B 2035/446* (2013.01); *F05B 2240/93* (2013.01); *F05B 2240/95* (2013.01)

(58) Field of Classification Search
CPC ........ B63B 2035/446; B63B 2021/206; B63B 2021/505; B63B 2022/028; B63B 21/50; B63B 21/508; B63B 22/025; B63B 39/06
USPC .......................................................... 114/264
See application file for complete search history.

(56) References Cited

U.S. PATENT DOCUMENTS

2019/0315438 A1* 10/2019 Prasad .................... B63B 39/06
2020/0088534 A1* 3/2020 Nakirikanti ........... G06F 16/906
2024/0409188 A1* 12/2024 García Ferrández ... B63B 21/50

FOREIGN PATENT DOCUMENTS

CN 207162985 U * 3/2018

* cited by examiner

*Primary Examiner* — Justin Michael Heston
(74) *Attorney, Agent, or Firm* — Boulware & Valoir PLLC

(57) ABSTRACT

The invention relates to a mooring system comprising a floating platform (1) with a plurality of mooring lines (7) configured to fix or anchor the floating platform (1) to the seabed by means of a bottom section (71) of each mooring line (7), wherein each mooring line (7) also comprises a central section (72) joined to a counterweight (8), wherein tilting arms (2) are joined by means of an articulated joint (3) to a main structure (4) of the floating platform (1), wherein each tilting arm (2) comprises an inner section (21) and an outer section (22), wherein the bottom section (71) and the central section (72) of each mooring line (7) are respectively joined to a terminal end of the outer section (22) and to a terminal end of the inner section (21) of each tilting arm (2).

20 Claims, 11 Drawing Sheets

MOORING SYSTEM

This invention is a § 371 National Phase entry based on PCT/IB2023/055233, filed on May 22, 2023, which claims priority to ES P20220030449, filed May 26, 2022, each of which is incorporated by reference in its entirety herein for all purposes.

OBJECT OF THE INVENTION

The object of the present invention is a mooring system especially suited for floating platforms that serve as the base for wind turbines located in the sea. The mooring system object of the present invention comprises a set of mooring cables or chains (mooring lines) attached to piles buried in the seabed or to weights located or placed on the seabed.

The mooring system object of the present invention has unique features that make it ideal to be used for floating platforms that serve as a base for offshore structures where it is important to avoid pitch or roll, and also solves certain drawbacks of other mooring systems for floating platforms in the state of the art.

The mooring system object of the present invention can be applied to any type of structure intended to float on the surface of the sea and which needs to have several mooring points on the seabed to hold the mooring cables or chains of the floating platforms.

Background of the Invention and Technical Problem to Solve

Floating platforms, especially those intended to support wind turbines that generate electrical energy from wind at sea, need mooring systems to keep them in the position thereof and contribute to the stability thereof.

Platforms known as Tension Leg Platforms (TLP) are known in the state of the art. These platforms comprise three or more mooring lines (usually chains or cables that connect the platform to piles anchored to the seabed). The mooring lines of TLPs are designed to be arranged in tension, joining the platform in a vertical position to each of the piles anchored to the seabed. TLPs comprise a set of floats designed to produce excess buoyancy of the platform (taking into account the weight of the structure that rests on the platform). This excess buoyancy guarantees a high degree of tension in the cables, which in turn guarantees that they are always arranged in a vertical position. This prevents the pitch and roll movements of the platform and of the structure that rests on the platform.

Document EP 2743170 A1 describes a TLP similar to the one described in the previous paragraph.

One drawback of TLPs is that the high tension of the cables necessary to keep them in a vertical position and thus avoid pitch and/or roll motions also prevents the platform from moving in the vertical direction. Thus, with a rising tide, the platform cannot move upwards (because the mooring lines have little or no extensibility) and therefore the tension on the mooring lines greatly increases. This creates a high risk of breaking the mooring lines and makes it necessary to have mooring lines with a thick cross section or increase the number of mooring lines. Additionally, when there are low tides, TLPs also go down and the mooring lines can become very loose, increasing the risk of the platform moving both vertically and laterally in an uncontrolled manner, and also increasing the risk of pitch and/or roll motions (due to the thrust of the wind and/or waves on the platform and the structure that rests thereon) that can cause the platform to capsize.

In order to avoid the aforementioned drawbacks, other types of floating platforms are known wherein the mooring lines are connected to a counterweight by means of pulleys located on the platform. These types of platforms allow for vertical and lateral motion of the platform in response to the tides, waves and wind, thus making it unnecessary to have a large number of mooring lines, or mooring lines with a thick cross section.

Document ES 2629867 A2 describes a platform similar to the one described in the previous paragraph.

One drawback of platforms equipped with counterweights and pulleys, such as those described above, is that the mooring lines (especially when they are mooring cables) become worn over time by bending since, as they pass through the pulleys, the mooring lines under tension bend and wear. Over time, this can cause the mooring line to break.

DESCRIPTION OF THE INVENTION

In order to solve the aforementioned drawbacks, the present invention relates to a mooring system.

The mooring system object of the present invention comprises a floating platform (especially suitable for supporting a wind turbine, although it can support any other type of structure) with a plurality of mooring lines (including chains or cables) configured to fix or anchor the floating platform to the seabed by means of a bottom section of each mooring line.

Each mooring line also comprises a central section joined to a counterweight (which makes it possible to stabilise the platform and ensure that there is always tension in the bottom sections of the mooring lines, while allowing the stresses due to the motion of the floating platform to be absorbed, thus making it so the bottom sections of the mooring lines do not have to withstand the same levels of tension that occur in TLP-type platforms.

The bottom section of each mooring line can comprise one, two or three cables that join the platform to the seabed. Likewise, the central section of each mooring line can also comprise one, two or three cables.

In a novel way, the mooring system object of the present invention comprises a plurality of tilting arms. Each tilting arm is joined by means of an articulated joint to a main structure (or central structure) of the floating platform, wherein said articulated joint is located in correspondence with an intermediate point of the tilting arm.

Thus, each tilting arm comprises an inner section and an outer section, wherein the inner section is located between the articulated joint and the interior of the floating platform (understanding the interior of the platform, or of the main structure of the platform, to be an area located closer to the centre of the floating platform than the point where the articulated joint is located) and wherein the outer section is located between the articulated joint and the exterior of the main structure of the floating platform (understanding the exterior of the platform, or of the main structure of the platform, as an area located closer to the centre of the floating platform than the point where articulated joint is located).

The bottom section and the central section of each mooring line are respectively joined to a terminal end of the outer section and to a terminal end of the inner section of each tilting arm.

The tilting arm is configured to rotate or tilt on a substantially vertical plane, with the axis of rotation thereof being approximately horizontal. This vertical plane can be radially arranged (running through the centre of the platform) or be oriented slightly laterally, giving the system a "spiral" appearance.

The system preferably has three, four or five radial mooring lines, evenly distributed along the contour thereof.

The mooring system described above allows the central section of each mooring line, along with the counterweight, to absorb a large part of the stresses due to wind, waves and currents, allowing the floating platform to move.

At the same time, the tilting arms eliminate the need for pulleys between the bottom section and the central section of each mooring line, thus avoiding the problem of wear due to bending of the cables on the pulleys.

The described system therefore allows cables to be used that have a much smaller cross section than the mooring cables used in TLPs, and eliminates the risk of the cable braking due from wear from bending on the pulleys.

According to one aspect of the invention, the inner section of each tilting arm can have a length that is shorter than the length of the outer section of the tilting arm. This configuration allows the floating platform to be installed in areas with larger waves.

Alternatively, according to another aspect of the invention, the outer section of each tilting arm can have a length that is shorter than the length of the inner section of the tilting arm. This configuration allows for the use of lighter counterweights.

Likewise, according to one aspect of the invention, the terminal end of the inner section of each tilting arm is located close to the centre of the floating platform, meaning the length of the inner section is slightly less than the distance from the articulated connection thereof to the centre of the floating platform. This configuration makes the floating platform less susceptible to capsizing from wind or waves and in the same conditions the pitch angles are smaller.

The tilting arms can be supported on the respective articulated joints thereof or can hang from the respective articulated joints thereof.

The inner section and the outer section of each tilting arm can be misaligned, for example the inner section and the outer section of each tilting arm can form an angle comprised between 10° and 20°. This makes it possible to improve the dynamic features of the floating platform and prevent the outer section from touching the surface of the sea when the platform moves.

According to a first embodiment of the mooring system, the floating platform has an annular geometry closed around the centre of the floating platform. This geometry can be in the shape of a polygonal ring closed around the centre of the floating platform, or it can be in the shape of a curved ring closed around the centre of the floating platform.

According to this first embodiment, the floating platform can comprise several radii that connect the alternate vertices of the perimeter, with a central float that supports the wind turbine tower. The articulated arms, which are radially arranged (when looking at the wind turbine tower), rest on the remaining vertices of the contour.

Likewise, according to this first embodiment, the floating platform can be asymmetrical, comprising several radii that connect the alternate vertices of the perimeter, with a central point (located on the vertical of the central counterweight). The articulated arms, which are radially arranged (when looking at the wind turbine tower), rest on the remaining vertices of the contour. The wind turbine tower can rest on one (or more) of the perimeter floats, which is especially oversized to support the weight of the tower and the wind turbine.

According to some embodiments of the mooring system, the floating platform has a star-shaped geometry with a plurality of protruding structural arms (or spikes) that run radially from a first end joined to the centre of the floating platform to a second end projecting to the exterior of the floating platform.

More specifically, according to a second embodiment of the mooring system, the floating platform has a star-shaped geometry with three protruding structural arms (or spikes), whereas according to a third embodiment of the mooring system, the floating platform has a star-shaped geometry with five protruding structural arms.

The second ends of the protruding structural arms (or spikes) can be rotated within an angle comprised between 20° and 70° with respect to the body of the protruding structural arm, thus providing greater support to the tilting arms. In this configuration (shown in FIGS. 2*a*, 2*b*, 3*a* and 3*b*), the tilting arms are not radial, but rather form a complementary angle (with the respective protruding structural arm of the star) to the angle of the rotated second end of the protruding structural arm (meaning, between 70° and 20°, respectively).

Of course, the floating platform can comprise common elements of other offshore wind platforms, such as: a resistant hull that provides buoyancy and support for the wind generator tower, several support points for the articulated arms, access elements to access the platform from an auxiliary boat, an electrical ground connection system, auxiliary electrical equipment (bilge pumps, batteries, etc.).

The stability of the platform is provided by the described mooring system.

BRIEF DESCRIPTION OF THE FIGURES

The following figures have been included as part of the explanation of at least one embodiment of the invention.

DETAILED DESCRIPTION

Figure 1A:
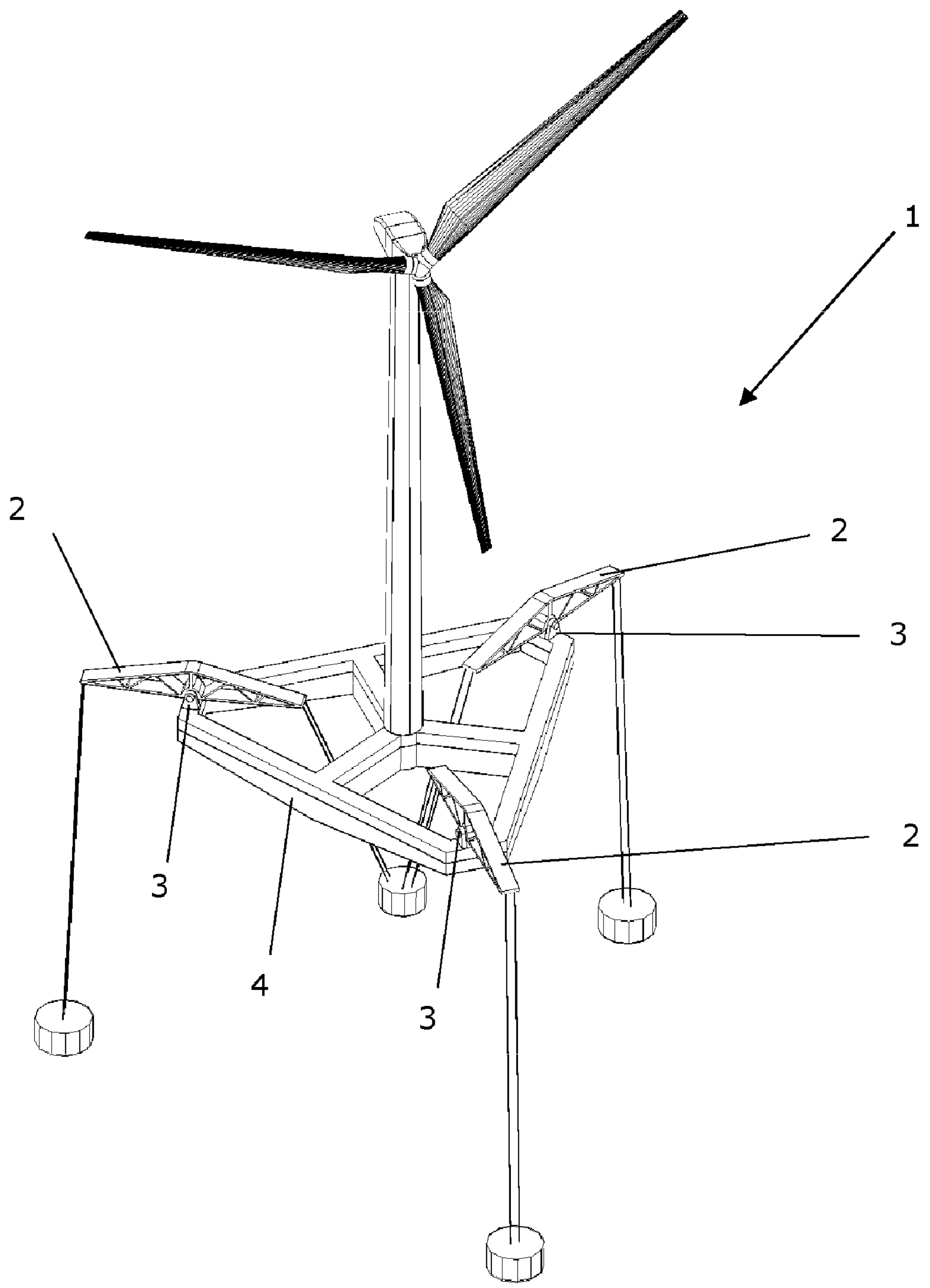
FIG. 1*a*: Shows a schematic perspective view of a first embodiment of the mooring system object of the present invention.

As previously mentioned, the present invention relates to a mooring system comprising a floating platform (1).

The floating platform (1) comprises a plurality of tilting arms (2).

Each tilting arm (2) comprises an articulated joint (3) attached to a point of the main structure (4) of the floating platform (1).

Each tilting arm (2) comprises an inner section (21) and an outer section (22). The inner section (21) of each tilting arm (2) is arranged closer to a centre (5) of the floating platform (1) than the outer section (22) of each tilting arm (2). The inner section (21) and the outer section (22) of the tilting arm (2) are connected to each other at a point on the tilting arm (2) located in correspondence with the articulated joint (3).

Figure 1B:
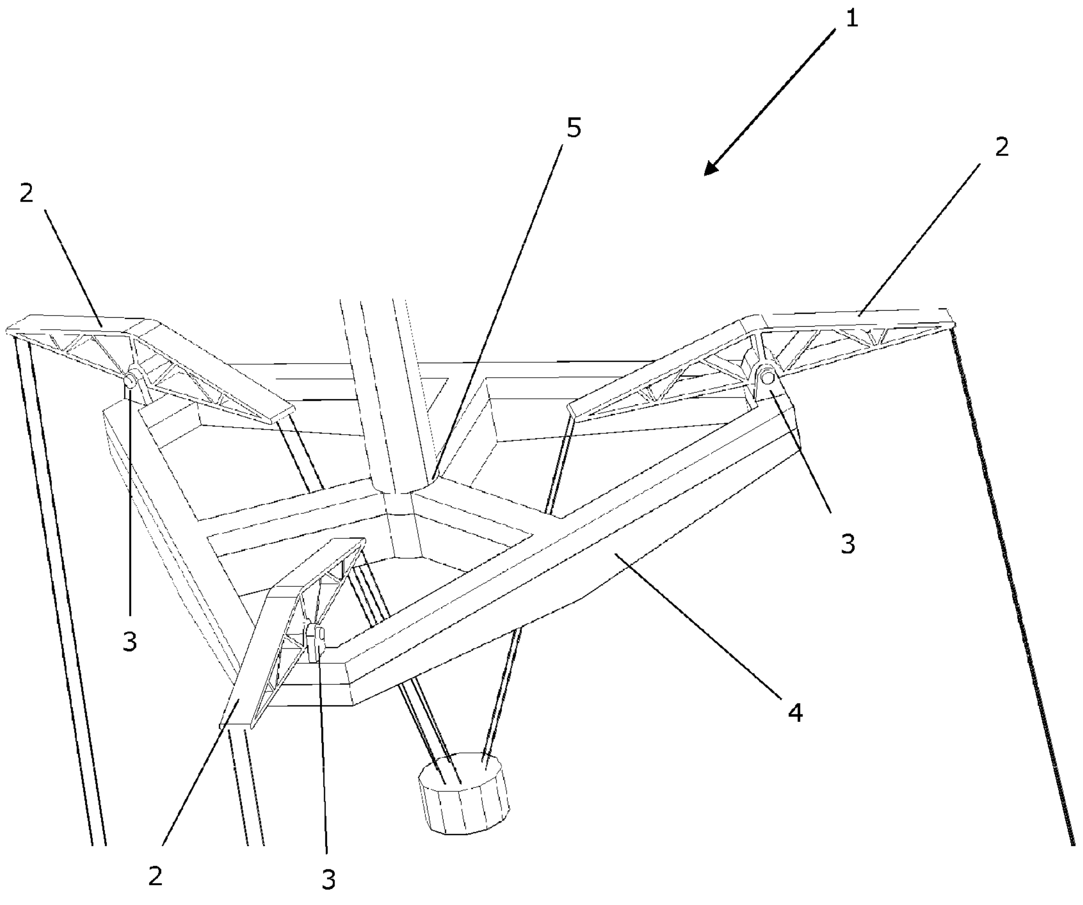
FIG. 1*b*: Shows a schematic perspective view of a detail of the mooring system of FIG. 1*a*.

FIG. 1*a* and FIG. 1*b* show a first embodiment of the floating platform (1), wherein the main structure (4) of the floating platform (1) comprises a closed or annular geometry, defining a closed ring (in this case with an approximately triangular geometry, although it could have a polygonal geometry with any number of sides or have a circular or other closed curve geometry) around the centre (5) of the floating platform (1).

In FIG. 1*a* and FIG. 1*b* it can be seen that the articulated joints (3) of the main structure (4) attached to the tilting arms (2) are located at the vertices of the polygonal ring (triangular in this case). However, the articulated joints (3) could be located at another point of the main structure (4), for example in the middle of one side of the polygonal ring.

According to other embodiments (see, for example, the second embodiment and the third embodiment described below), the main structure (4) can comprise a star-shaped geometry with a specific number of spikes or protruding structural arms (6), wherein each spike or protruding structural arm (6) comprises a first end (61) joined to the centre (5) of the floating platform (1) and a second end (62) wherein an articulated joint (3) is located attached to a tilting arm (2).

Figure 2A:
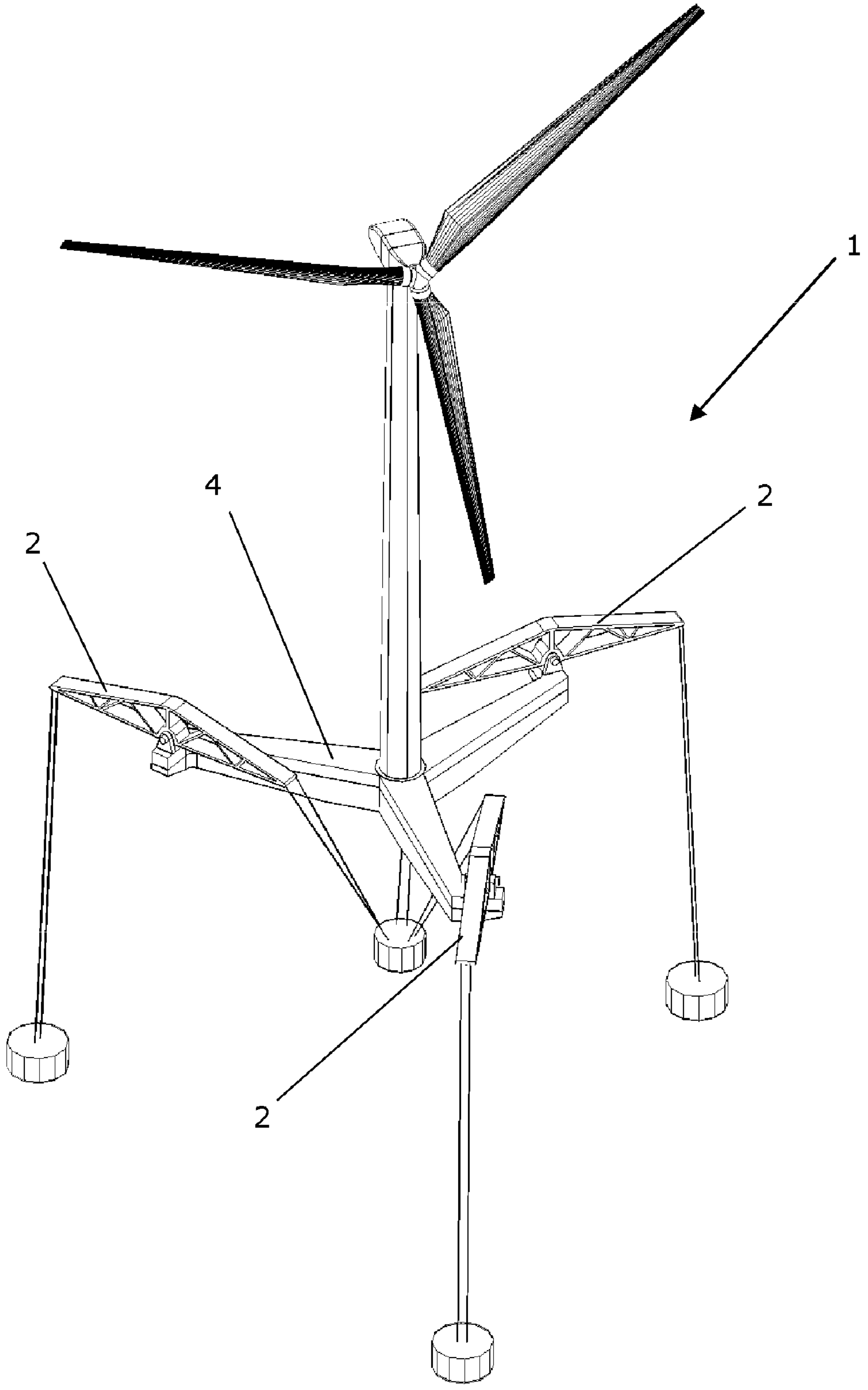
FIG. 2*a*: Shows a schematic perspective view of a second embodiment of the mooring system object of the present invention.
Figure 2B:
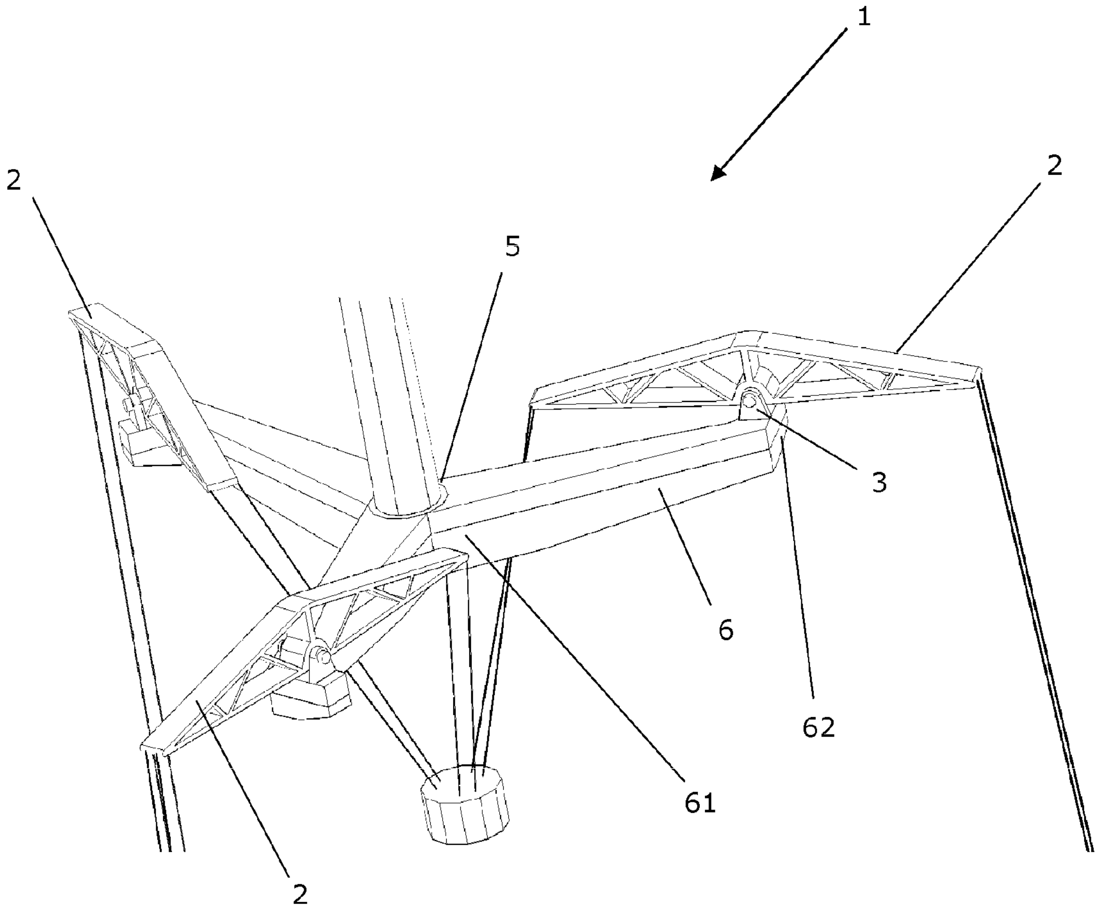
FIG. 2*b*: Shows a schematic perspective view of a detail of the mooring system of FIG. 2*a*.

In FIG. 2*a* and FIG. 2*b*, a second embodiment of the floating platform (1) is shown, wherein the main structure (4) of the floating platform (1) comprises a star-shaped geometry with three spikes or three protruding structural arms (6).

Figure 3A:
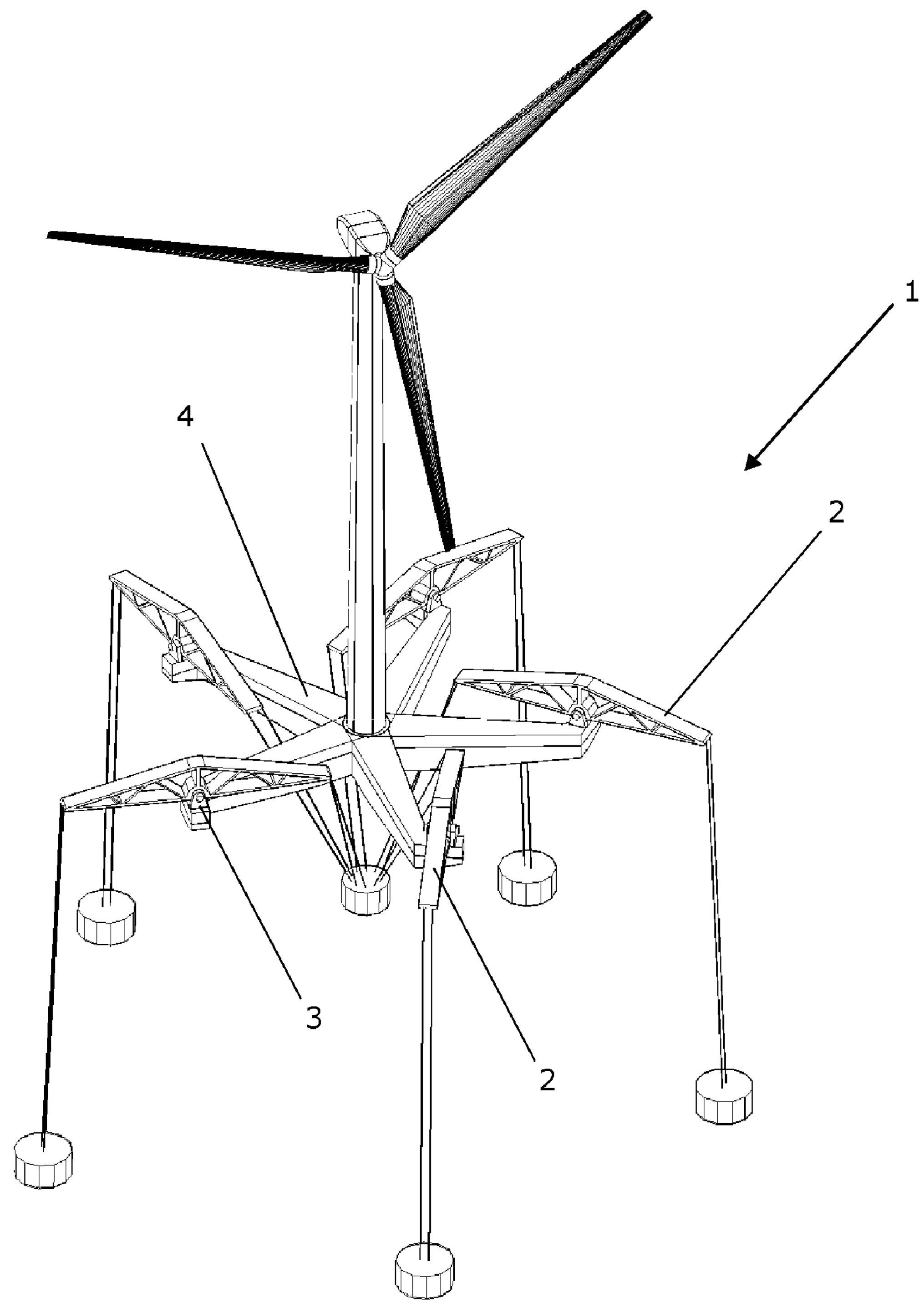
FIG. 3*a*: Shows a schematic perspective view of a third embodiment of the mooring system object of the present invention.
Figure 3B:
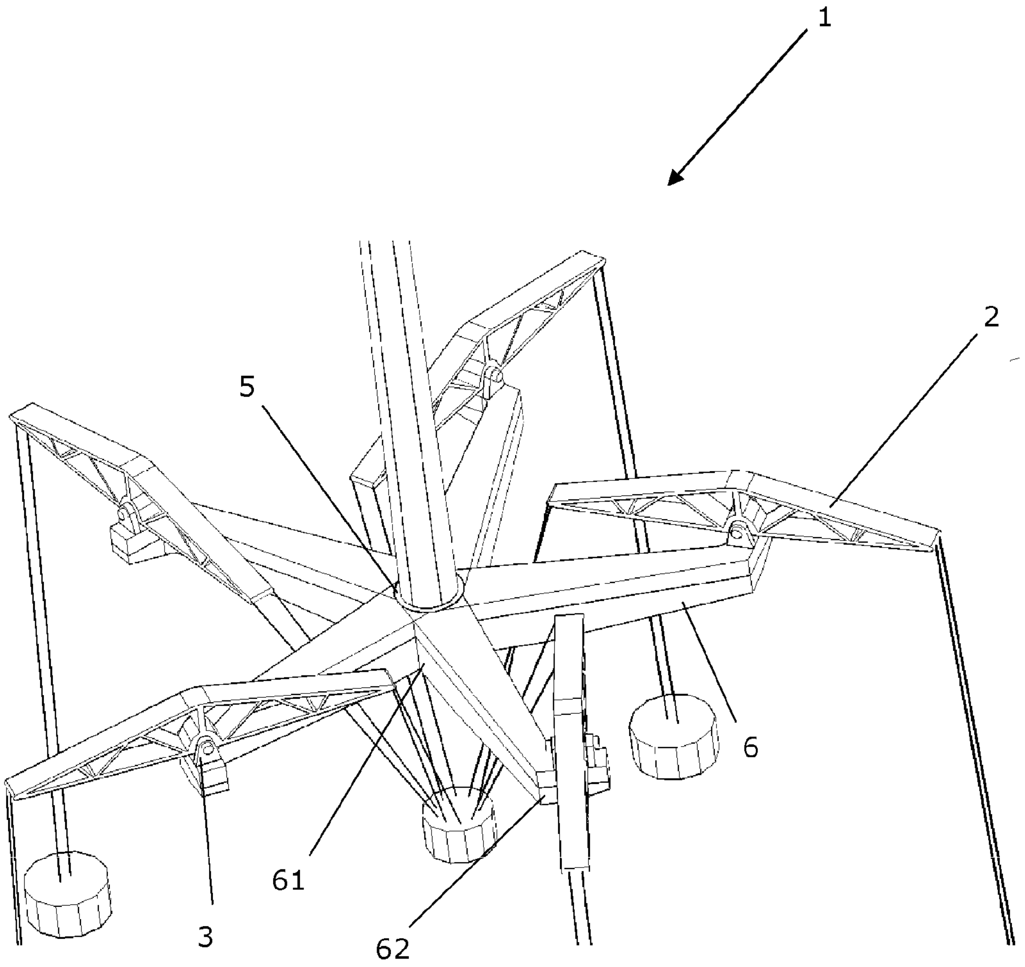
FIG. 3*b*: Shows a schematic perspective view of a detail of the mooring system of FIG. 3*a*.

In FIG. 3*a* and FIG. 3*b*, a second embodiment of the floating platform (1) is shown, wherein the main structure (4) of the floating platform (1) comprises a star-shaped geometry with five spikes or five protruding structural arms (6).

Each tilting arm (2) forms part of a mooring line (7) of the floating platform (1).

Each mooring line (7) comprises a bottom section (71) and a central section (72), joined together by a tilting arm (2). The bottom section (71) and the central section (72) can comprise mooring chains or cables.

The bottom section (71) of the mooring line (7) is connected to a bottom weight (73) (also called "dead weight") or anchor or pile buried in the seabed, and to a terminal end of the outer section (22) of a tilting arm (2). The central section (72) of the mooring line (7) is connected to a central counterweight (8) of the floating platform (1) and to a terminal end of the inner section (21) of said tilting arm (2).

Figure 4A:
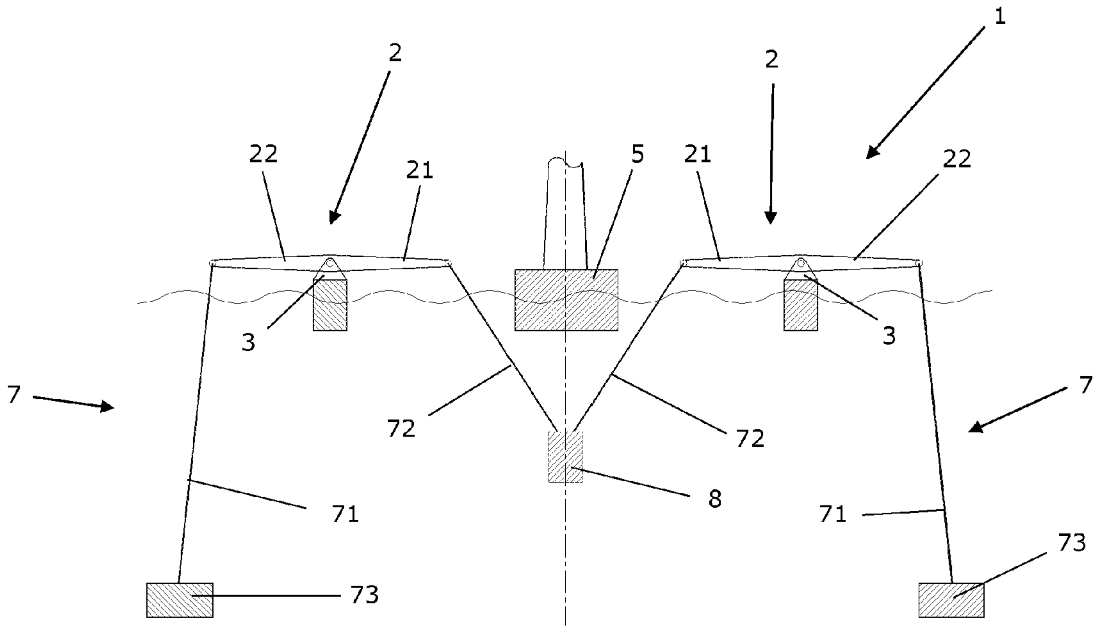
FIG. 4*a*: shows a schematic view of the most generic configuration of the tilting arms, wherein two tilting arms can be seen located in a symmetrical position with respect to a plane that passes through the centre of the floating platform structure.

FIG. 4*a* schematically shows a side view of a floating platform (1) in a generic configuration. Two symmetrical mooring lines (7) are represented with respect to a plane of symmetry that passes through the centre (5) of the floating platform (1). This symmetrical configuration can occur, for example, in floating platforms (1) that have an even number of mooring lines (7) and/or in floating platforms (1) that have a main structure (4) with a symmetrical geometry with respect to a plane that passes through the centre (5) of the floating platform (1) (such as a geometry in the form of an equilateral or isosceles triangle).

Figure 4B:
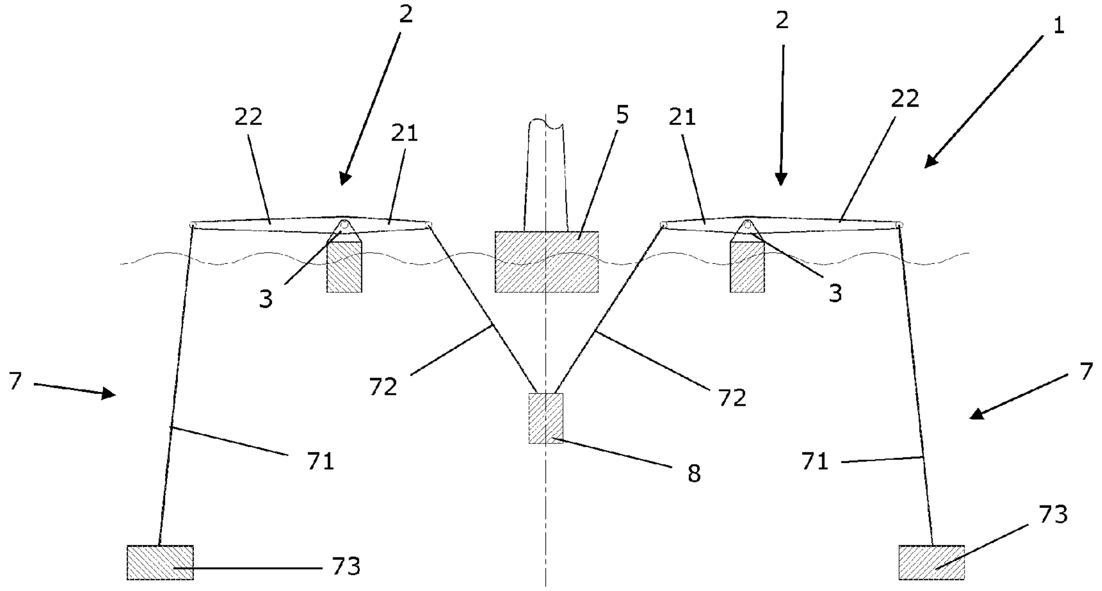
FIG. 4*b*: Shows a schematic view of a configuration wherein the inner section of the tilting arms is shorter than the outer section, wherein two tilting arms can be seen located in a symmetrical position with respect to a plane that passes through the centre of the floating platform structure.
Figure 4C:
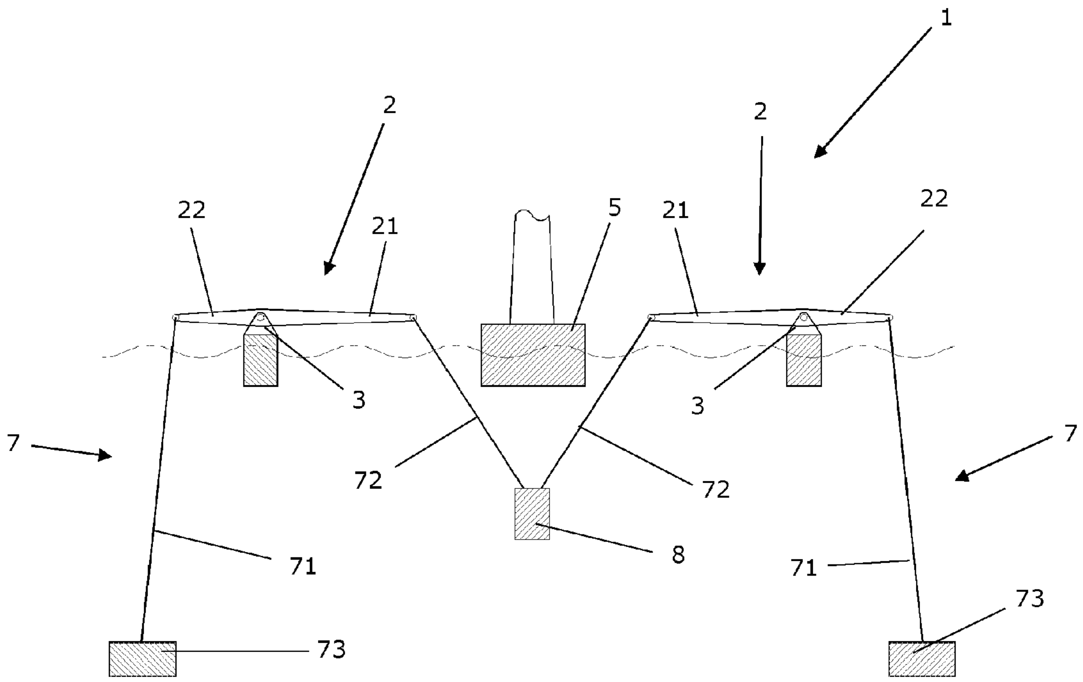
FIG. 4*c*: Shows a schematic view of a configuration wherein the outer section of the tilting arms is shorter than the inner section, wherein two tilting arms can be seen located in a symmetrical position with respect to a plane that passes through the centre of the floating platform structure.

FIG. 4*a*, FIG. 4*b*, FIG. 4*c*, FIG. 4*d* and FIG. 4*f* show embodiments in which each tilting arm (2) rests on the respective articulated joint (3) thereof. On the contrary, FIG. 4*e* shows an embodiment in which each tilting arm (2) hangs from the respective articulated joint (3) thereof.

FIG. 4*a* shows a possible embodiment in which the inner section (21) and the outer section (22) of each tilting arm (3) have the same length. On the contrary, FIG. 4*b* shows an embodiment in which the inner section (21) of each tilting arm (2) is shorter than the outer section (22), whereas FIG. 4*c* shows an embodiment in which the outer section (22) of each tilting arm (2) is shorter than the inner section (21).

Figure 4D:
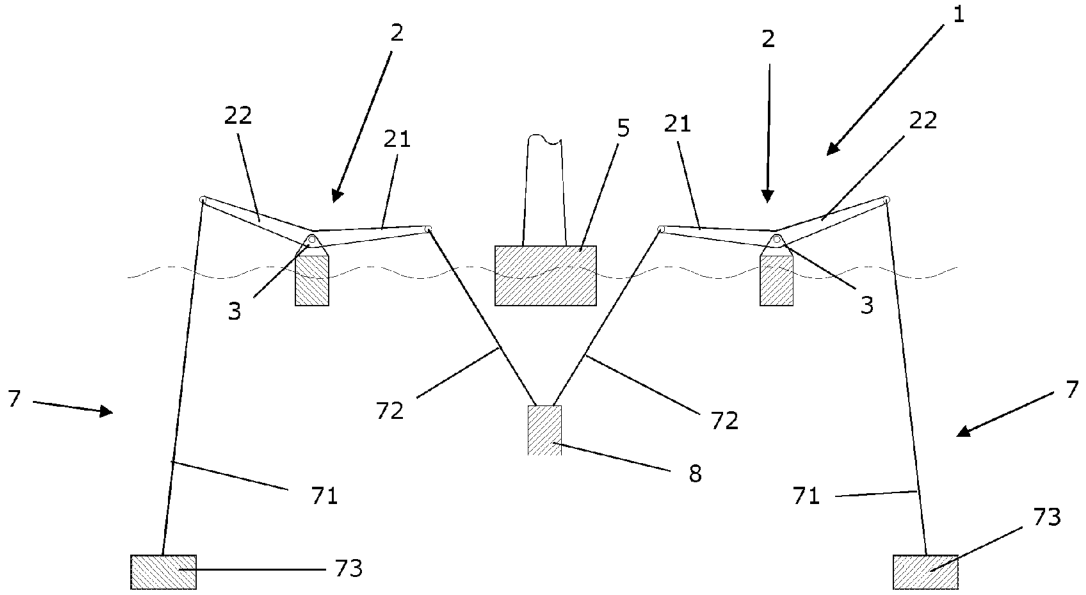
FIG. 4*d*: Shows a schematic view of a configuration wherein the inner section and the outer section of the tilting arms are misaligned, wherein two tilting arms can be seen located in a symmetrical position with respect to a plane that passes through the centre of the floating platform structure.
Figure 4E:
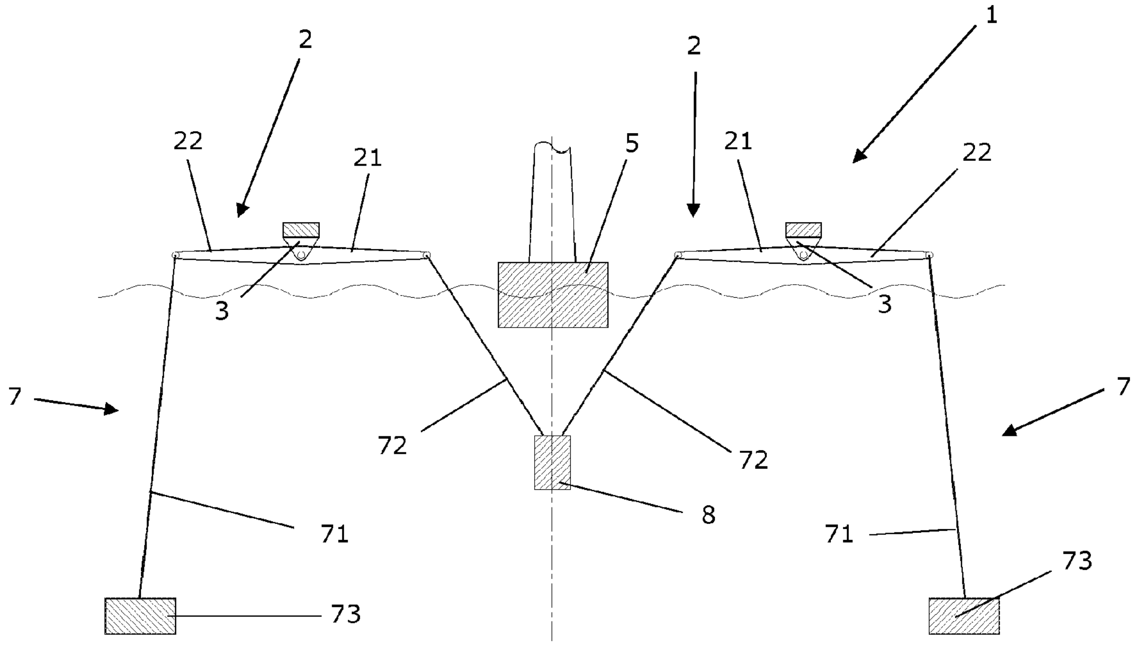
FIG. 4*e*: Shows a schematic view of a configuration wherein the tilting arms hang from the respective articulated joints thereof attached to the floating platform structure, wherein two tilting arms can be seen located in a symmetrical position with respect to a plane that passes through the centre of the floating platform structure.
Figure 4F:
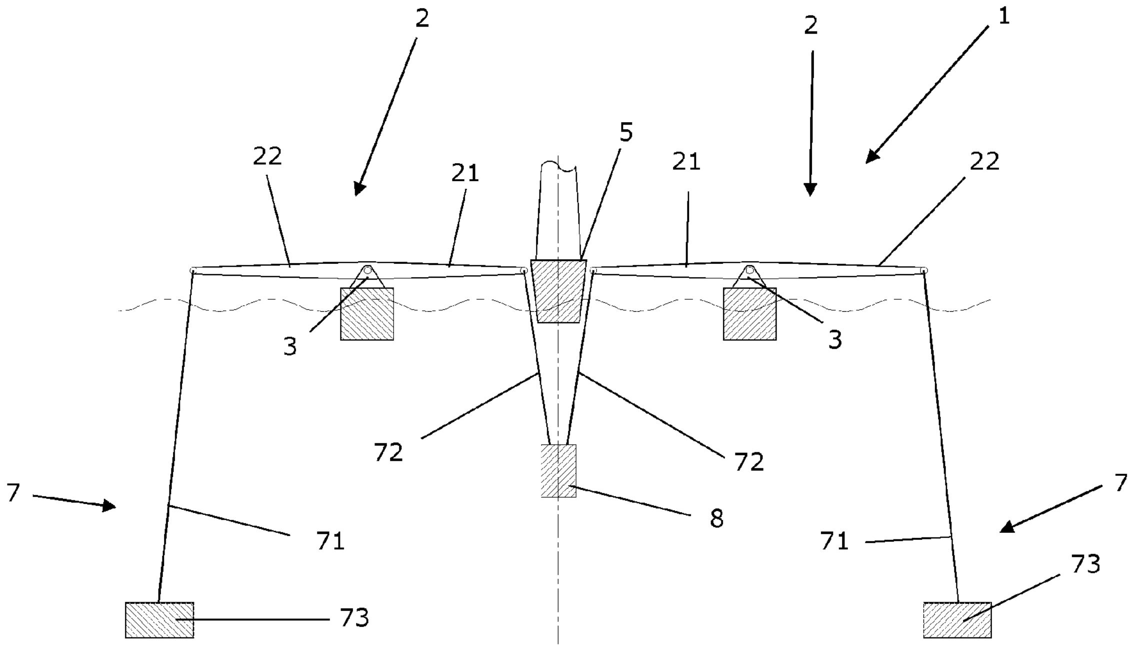
FIG. 4*f*: Shows a schematic view of a configuration wherein the inner section of the tilting arms extends almost to the centre of the floating platform structure, wherein two tilting arms can be seen located in a symmetrical position with respect to a plane that passes through the centre of the floating platform structure.

FIG. 4*f* shows a possible embodiment wherein the inner section (21) of each tilting arm (2) extends almost to the centre (5) of the floating platform (1).

FIG. 4*d* shows a possible embodiment wherein the inner section (21) and the outer section (22) of each tilting arm (2) are misaligned (for example, forming an angle of 15° with respect to each other).

Figure 5A:
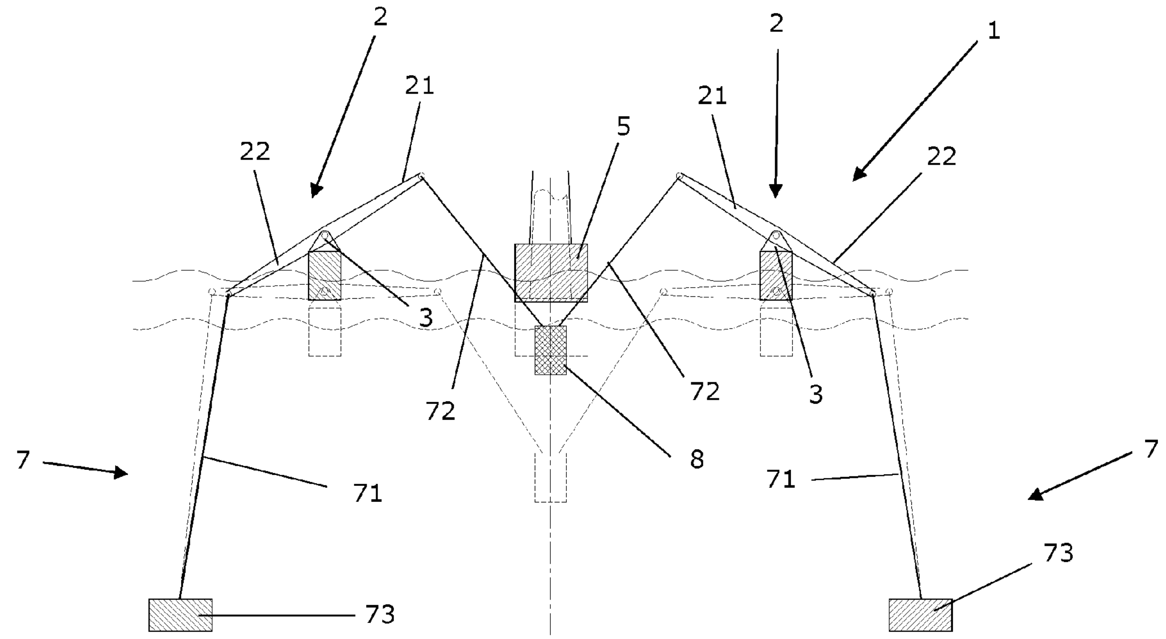
FIG. 5*a*: Shows a schematic view of the behaviour of the tilting arms of the floating platform during an upward vertical movement, due to a rising tide or to the swell.
Figure 5B:
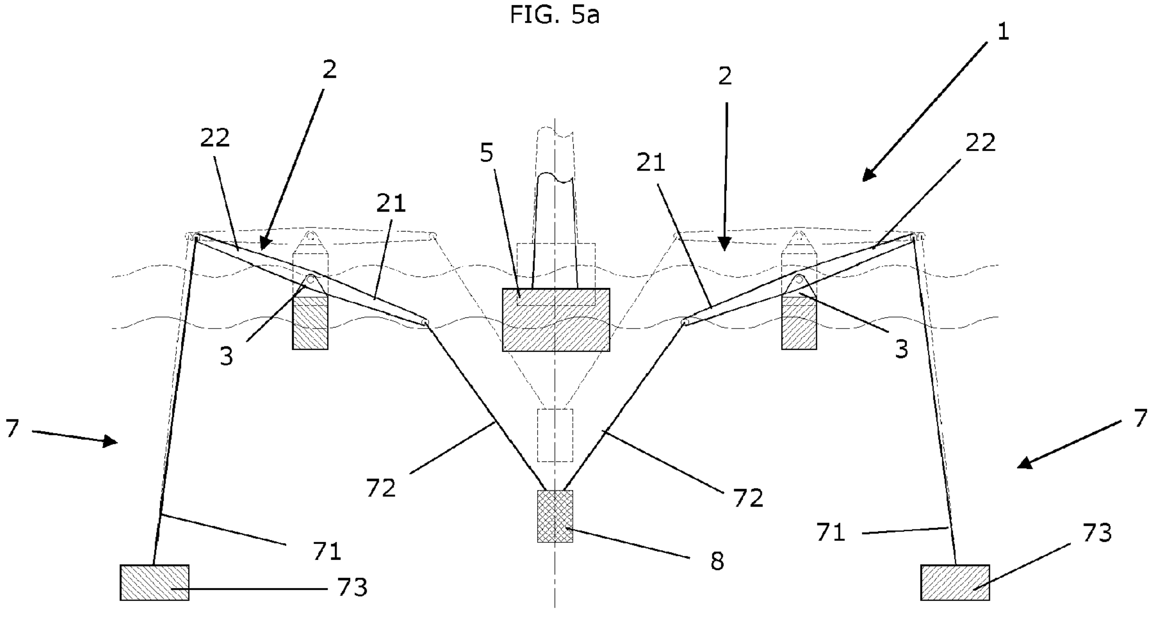
FIG. 5*b*: Shows a schematic view of the behaviour of the tilting arms of the floating platform during a downward vertical movement, due to a receding tide or to the swell.

FIG. 5*a* and FIG. 5*b* show the behaviour of the floating platform (1) and, in particular, the behaviour of the mooring lines (7) when the tide or waves produce a vertical ascent or a vertical descent, respectively, (without horizontal movement) of the floating platform (1). They show the case of tilting arms (2) resting on the respective articulated joints (3) thereof, wherein the inner section (21) and the outer section (22) of each tilting arm (2) are aligned and have the same length.

When the tide rises (FIG. 5*a*), the floating platform (1) moves upwards, and given that the bottom section (71) and the central section (72) of the mooring lines (7) are practically inextensible, the terminal end of each outer section (22) of each tilting arm (2) essentially remains in the same initial position thereof (in the figures a minimum horizontal movement is observed). In other words, the tilting arms (2) rotate around the terminal end of the outer section (22).

FIG. 5*a* shows the initial position of the floating platform (1) in dashed lines, and the final position (after the tide has risen) of the floating platform (1) in solid lines.

Thus, when the tide rises, the bottom section (71) of each mooring line (7) pulls on the respective terminal end of the outer section (22) of each tilting arm (2), making the tilting arm (2) tilt towards the outside of the floating platform (1), thus pulling on the central section (72) of the mooring line (7) and thereby raising the counterweight (8).

The tension withstood by the bottom sections (71) is less than that which they would have to withstand in the case of a TLP, since part of said tension is counteracted by the tilting movement of the tilting arms (2) and the rise of the counterweight (8).

As the tide recedes (FIG. 5*b*), the floating platform (1) moves downwards.

FIG. 5*b* shows the initial position of the floating platform (1) in dashed lines, and the final position (after the tide has receded) of the floating platform (1) in solid lines.

If the structure were a TLP, the design of the mooring lines (7) and the buoyancy of the floating platform (1) would have to be done in a way so as to overtighten the mooring lines (7) so that, when the tide receded, said mooring lines would continue to be tight (to avoid uncontrolled movements of the floating platform (1)).

However, with the mooring system object of the present invention, it is not necessary to overtighten the mooring lines (7) in the design, since at low tide the counterweight (8) descends more than the main structure (4) of the floating platform (1) and pulls on the inner sections (21) of each tilting arm (2), keeping the bottom sections (71) of the mooring lines (7) tight.

Therefore, when the tide recedes, the terminal end of each outer section (22) of each tilting arm (2) also remains essentially in the same initial position thereof (a minimum horizontal movement can be seen in the figures). In other words, the tilting arms (2) rotate around the terminal end of the outer section (22).

Thus, at low tide, the central section (72) of each mooring line (7) pulls on the respective terminal end of the inner section (21) of each tilting arm (2), causing the tilting arm (2) to tilt towards the inside (towards the centre (5)) of the floating platform (1), thus pulling on the bottom section (71) of the mooring line (7), thereby keeping the bottom section (71) tight and thus guaranteeing the stability of the floating platform (1).

Figure 5C:
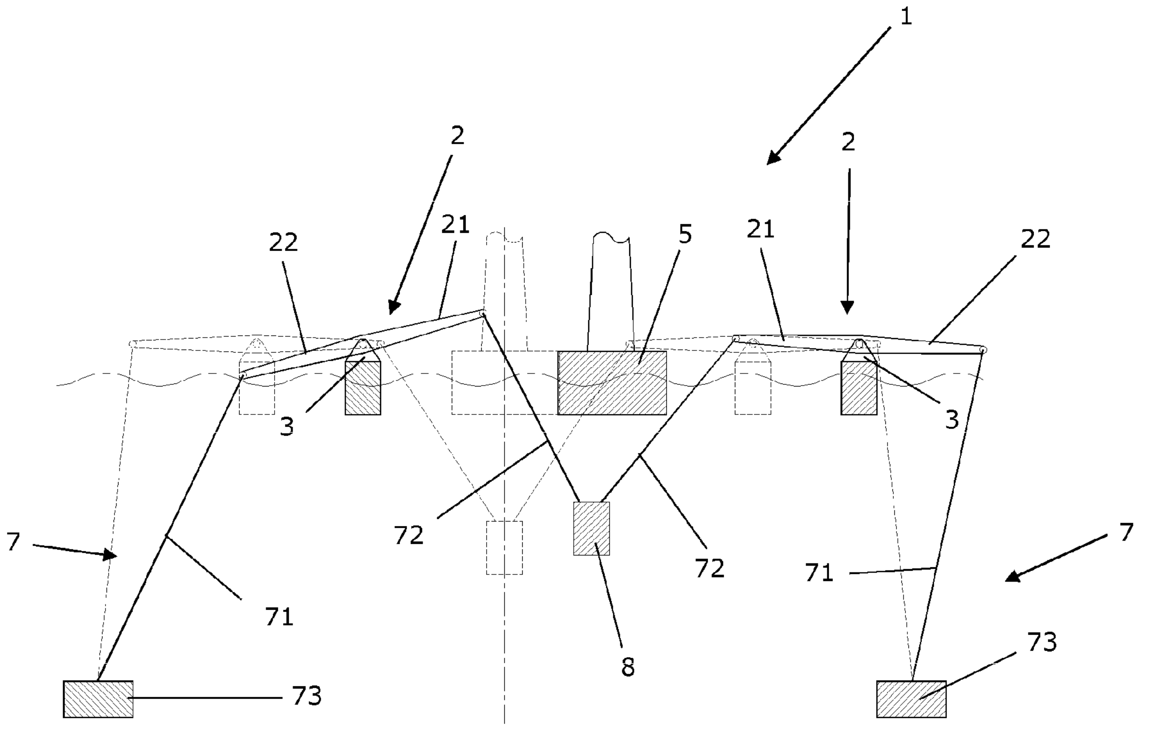
FIG. 5*c*: Shows a schematic view of the behaviour of the tilting arms of the floating platform during a horizontal movement due to the swell or currents or the horizontal thrust of the wind.

FIG. 5*c* shows the behaviour of the floating platform (1) and, in particular, the behaviour of the mooring lines (7) when waves, sea currents or wind move the floating platform (1) horizontally. They show the case of tilting arms (2) resting on the respective articulated joints (3) thereof, wherein the inner section (21) and the outer section (22) of each tilting arm (2) are aligned and have the same length.

FIG. 5*c* shows the initial position of the floating platform (1) in dashed lines, and the final position (after having moved horizontally) of the floating platform (1) in solid lines.

As can be seen, in the case of a horizontal movement of the floating platform (1), the tilting arm (2) of the mooring line (7) located windward, experiences a greater inclination than the inclination experienced by the tilting arm (2) of the mooring line (7) located leeward.

The counterweight (8) moves horizontally a distance slightly less than the distance the centre (5) of the floating platform (1) moves, thus becoming offset to the plane of symmetry that passes through the centre (5) of the floating platform (1). Moreover, despite the fact that the main structure (4) of the floating platform (1) does not experience any vertical movement, the counterweight (8) does experience an upward vertical movement towards the main structure (4) of the floating platform (1).

As already mentioned (and as shown in FIG. 4*d*), there is an embodiment in which the inner section (21) and the outer section (22) of each tilting arm (2) form an angle between each other.

This tilt angle between the inner section (21) and the outer section (22) of the tilting arms (2) has the effect of moving said sections (21, 22) away from the surface of the water, thus making it easier for them to tilt without coming into contact with the water when descending.

If there is no such tilt angle between both sections (21, 22) of the tilting arms (2), and if there is no wind, the tilting arms (2) should initially be horizontal (so can move up or move down at the same distance from the waves). However, the floating platform (1) is usually moved laterally by the wind (it is desirable that there is always wind to generate energy in the wind turbine located on the floating platform (1)). When moving laterally, the outer sections (22) of each tilting arm (1) move down, but it is good that they can move up and down the same distance, this being the reason why there is an embodiment in which the tilting arms (2) are designed with the sections (21, 22) thereof forming an angle to each other. This is especially useful for the outer section (22) of the tilting arm (2), since the inner section (21) always tends to move away from the surface of the water, but in any case the inner section (21) thus remains approximately perpendicular to the central section (72) of the mooring line (7), so that a greater effectiveness of the inner section (21) is also achieved (by having a bigger lever arm).

The invention claimed is:

1. A mooring system comprising a floating platform, wherein the floating platform is connectable to a plurality of bottom mooring lines for fixing or anchoring the floating platform to the seabed and to a corresponding plurality of central mooring lines joined to a counterweight, wherein the floating platform comprises a plurality of tilting arms, wherein each tilting arm is joined by means of an articulated joint to a main structure of the floating platform, wherein said articulated joint is located in correspondence with an intermediate point of the tilting arm such that each tilting arm comprises an inner section and an outer section, wherein the bottom and the central mooring lines are each respectively joined to a terminal end of the outer section and to a terminal end of the inner section of each tilting arm.

2. The mooring system according to claim 1, wherein the floating platform comprises a plurality of mooring lines configured to fix or anchor the floating platform to the seabed by means of a bottom section of each mooring line, wherein each mooring line also comprises a central section joined to a counterweight, wherein the inner section of each tilting arm is located between the articulated joint and the interior of the floating platform and wherein the outer section is located between the articulated joint and the exterior of the main structure of the floating platform, wherein the bottom section and the central section of each mooring line are respectively joined to a terminal end of the outer section and to a terminal end of the inner section of each tilting arm, and wherein the bottom mooring lines correspond to the bottom sections of the mooring lines and the central mooring lines correspond to the central sections of the mooring lines.

3. The mooring system according to claim 1, wherein the inner section of each tilting arm has a length that is less than the length of the outer section of the tilting arm.

4. The mooring system according to claim 1, wherein the outer section of each tilting arm has a length that is less than the length of the inner section of the tilting arm.

5. The mooring system according to claim 1, wherein: the tilting arms are supported by the respective articulated joints (3) thereof, or the tilting arms (2) hang from the respective articulated joints (3) thereof.

6. The mooring system according to claim 1, wherein the inner section and the outer section of each tilting arm are misaligned.

7. The mooring system according to claim 6, wherein the inner section and the outer section of each tilting arm form an angle comprised between 10° and 20°.

8. The mooring system according to claim 1, wherein the floating platform (1) has an annular geometry closed around a centre (5) of the floating platform (1).

9. The mooring system or floating platform according to claim 8, wherein the floating platform comprises several radii that connect alternate vertices of the perimeter with a central float for supporting a wind turbine tower, wherein the articulated arms are radially arranged and rest on remaining vertices.

10. The mooring system according to claim 8, wherein the floating platform has a geometry in the form of a polygonal ring closed around the centre of the floating platform.

11. The mooring system according to claim 8, wherein the floating platform has a geometry in the form of a curved ring closed around the centre of the floating platform.

12. The mooring system according to claim 1, wherein the floating platform has a star-shaped geometry with a plurality of protruding structural arms that run radially from a first end joined to a centre of the floating platform to a second end projecting towards the outside of the floating platform.

13. The mooring system according to claim 12, wherein the floating platform has a star-shaped geometry with three protruding structural arms, with the respective mooring lines thereof, or wherein the floating platform has a star-shaped geometry with five protruding structural arms, with the respective mooring lines thereof.

14. The mooring system according to claim 12, wherein the protruding structural arms comprise the second ends thereof rotated an angle comprised between 20° and 70° with respect to the body of the protruding structural arm, and wherein each tilting arm is joined to the respective second end of each protruding structural arm be means of the respective articulated joint thereof.

15. A floating platform, wherein the floating platform comprises a plurality of tilting arms, wherein each tilting arm is joined by means of an articulated joint to a main structure of the floating platform, wherein said articulated joint is located in correspondence with an intermediate point of the tilting arm between first and second terminal ends of the tilting arm, wherein the first terminal end of each tilting arm is connectable to a bottom section mooring line configured to fix or anchor the floating platform to the seabed, and the second terminal end of each tilting arm is connectable to a central section mooring line joined to a counterweight.

16. The floating platform according to claim 15, wherein the first terminal end of each tilting arm is comprised in an outer section of said tilting arm and the second terminal end each tilting arm is comprised in an inner section of said tilting arm.

17. The mooring system according to claim 16, wherein the inner section of each tilting arm has a length that is less than the length of the outer section of the tilting arm.

18. The mooring system according to claim 16, wherein the outer section of each tilting arm has a length that is less than the length of the inner section of the tilting arm.

19. The mooring system according to claim 16, wherein the inner section and the outer section of each tilting arm are misaligned.

20. The mooring system according to claim 16, wherein the inner section and the outer section of each tilting arm form an angle comprised between 10° and 20°.

* * * * *